Sept. 15, 1970     J. K. BOWKER     3,528,749

APPARATUS FOR MEASURING OPTICAL DENSITY

Filed Dec. 9, 1966

JOHN KENT BOWKER
INVENTOR

BY *[signatures]*

ATTORNEYS

*[signature]*
AGENT

United States Patent Office 3,528,749
Patented Sept. 15, 1970

3,528,749
APPARATUS FOR MEASURING OPTICAL DENSITY
John Kent Bowker, Marblehead, Mass., assignor to Itek Corporation, Lexington, Mass., a corporation of Delaware
Filed Dec. 9, 1966, Ser. No. 600,582
Int. Cl. G01n 21/06, 21/22; G01j 1/10
U.S. Cl. 356—202                     4 Claims

ABSTRACT OF THE DISCLOSURE

In accordance with an embodiment of the invention, electrical signals from an optical to electrical transducer are compared to the discharge voltage of an RC circuit. When these two signals are equal, an AND gate is disabled which blocks the transmission of clock pulses to a digital counter. The counter output is a digital representation of the optical density of the material being measured. The AND gate is enabled from the time the condenser circuit starts to discharge, from a voltage representing a density of zero, until the two signals are equal. The time interval during which the gate is enabled is proportional to density.

In another embodiment, an optical reference signal is compared to the capacitive discharge. When these two quantities are equal, the AND gate is enabled and the gate is disabled thereafter as disclosed above.

Thus, changes in the radiation source which cause apparent changes in the measured density, are compensated for by change in the time period that the gate is enabled, allowing for a change in the number of stepping pulses which are transmitted to the counter.

BACKGROUND OF THE INVENTION

Field of the invention

The present invention relates to a densitometer and more particularly to a direct reading digital densitometer.

The term density as applied to photographic systems refers to measurement of the opacity of an image on an exposed photographic plate or film. A densitometer is an instrument for measuring this quantity which is generally expressed as the negative logarithm to the base 10 of the transmittance of a developed photographic image.

Various mechanical, optical and electrical devices have been used to measure this quantity. None of these, however, have provided a direct digital measurement of optical density utilizing a stable direct reading true negative logarithmic characteristic, and no electronic devices provide a means for absolute calibration by measurements independent of density measurement.

SUMMARY OF THE INVENTION

The present invention provides an instrument which directly measures optical density using a direct negative logarithmic characteristic and obtains an output in digital form which is directly proportional to the measured negative logarithm.

An object of the invention is to provide an improved densitometer capable of providing highly accurate measurements, which can be calibrated by measuring stable component values.

A further object of the invention is the provision of a densitometer having an output in digital form.

Still another object is the provision of a device to measure optical density, presenting output information in digital form which is directly proportional to physical logarithmic input characteristics.

A further object of the invention is to provide an instrument which can measure the attenuation of a signal by using the electrical output of linear transducers.

These and other objects and advantages of the invention will become more fully apparent to those skilled in the art from the following description taken in conjunction with the accompanying drawings in which like reference numerals designate like parts and wherein:

DRAWINGS

DESCRIPTION OF THE EMBODIMENTS

Figure 1:
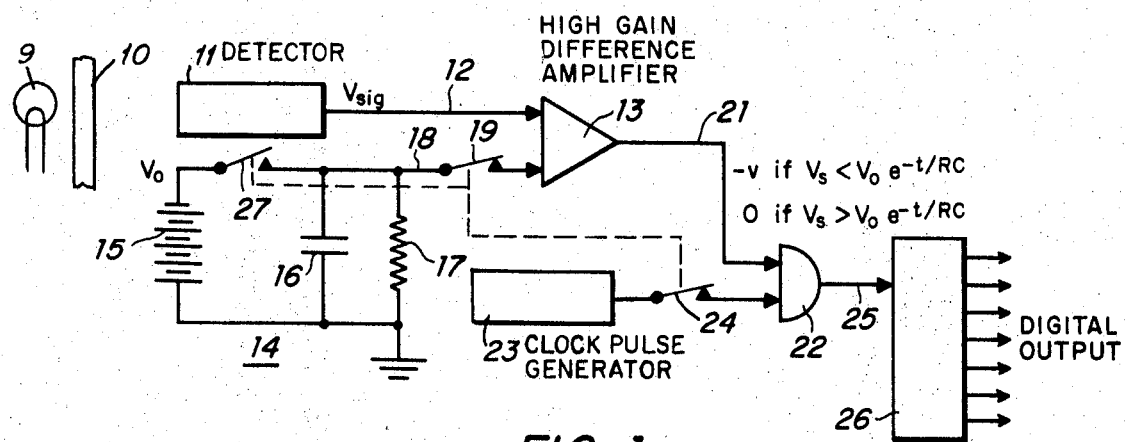
FIG. 1 is a block diagram depicting an embodiment of the invention.

Referring now to FIG. 1 there is shown an embodiment of the invention wherein an optical to electrical transducer 11 senses light from a source 9 transmitted through an exposed and developed photographic plate or film 10, or similar objects, which have the property of causing light or signal attenuation. An electrical signal indicative of such transmission is coupled via lead 12 to one input of a summation circuit 13, such as a high gain differential amplifier. A capacitor discharge circuit 14 comprises the parallel combination of a source of DC voltage 15, capacitor 16 and resistor 17, connected by a lead 18 through a switch 19 to the other input of summation circuit 13. The output of the summation circuit 13 is connected via lead 21 to an AND gate 22. A clock pulse generator circuit 23 is connected to the other input of AND gate 22 via switch 24 which switch is ganged to switch 19. The output of AND gate 22 on lead 25 is connected to a conventional digital counter 26. Output leads from counter 26 may be connected to any of a number of devices including display, recording, further processing or utilization devices.

At time $t_0$ switches 19 and 24 are closed which action completes a discharge path for capacitor 16 through the summation amplifier 13 via lead 18 and now closed switch 19. Simultaneously therewith switch 27 is opened to enable capacitor 16 to discharge logarithmically through resistor 17. The capacitor had been previously charged by the source 15, switch 27 being closed, completing a charge path. Also at $t_0$ closure of switch 24 completes a circuit between the 23 and input lead 25 to counter 26 through AND gate 22. The logic of the AND gate is such that a negative voltage from summation network 13 will enable this gate and allow clock pulses to pass to the counter.

The output of summation circuit 13 is negative when the voltage on line 12, representative of the transmission through the exposed photograph, is less than the instantaneous discharge voltage on line 18. Once the voltage on line 12 is equal to or less than the voltage on line 18, the output of the summation network 13 is 0. This may be instrumented any of a number of ways in addition to that shown. For example, Schmitt triggers might be used. This zero output disables AND gate 22 which in turn blocks the transmission of clock pulses to the counter 26 on lead 25.

Since the decay rate of the capacitor is a true logarithmic function, the digital output will be directly proportional to the optical density expressed as a logarithmic quantity. The voltage on the capacitor 16 may be expressed by the following equation:

$$V = V_0 e^{-t/RC} \tag{1}$$

or $$\ln V/V_0 = -t/RC \tag{2}$$

If $V_0$ is proportional to the incident light on the sample $I_0$, $$V_0 = k_0 I_0 \quad (3)$$

and $V_1$ is proportional to the transmitted light intensity I, $$V_1 = kI \quad (4)$$

where $k_0$ is made equal to $k_1$ by adjustment, then the time interval during which the gate is enabled T is given by $t$ when $$V_1 = V \quad (5)$$

Since $$t = -RC \ln \frac{V}{V_0} \quad (6)$$

then $$T = -RC \ln \frac{V_1}{V_0} \quad (7)$$

T is then a true negative logarithmic variable.

The definition of density is given as $$D = -\log_{10} \frac{I}{I_0} \quad (8)$$

so that since $$\frac{V_1}{V_0} = \frac{k_1 I}{k_0 I_0} \quad (9)$$

and $$k_1 = k_0 \quad (10)$$

$$\frac{V_1}{V_0} = \frac{I}{I_0} \quad (11)$$

and $$T = 1 RC \ln \frac{I}{I_0} \quad (12)$$

$$= RC(2.303) \log_{10} \frac{I}{I_0} \quad (13)$$

$$\frac{I}{I_0} = 2.303 RC \quad (14)$$

The density (D) is then given by $$D = \frac{T}{2.303 RC} \quad (15)$$

Figure 2:
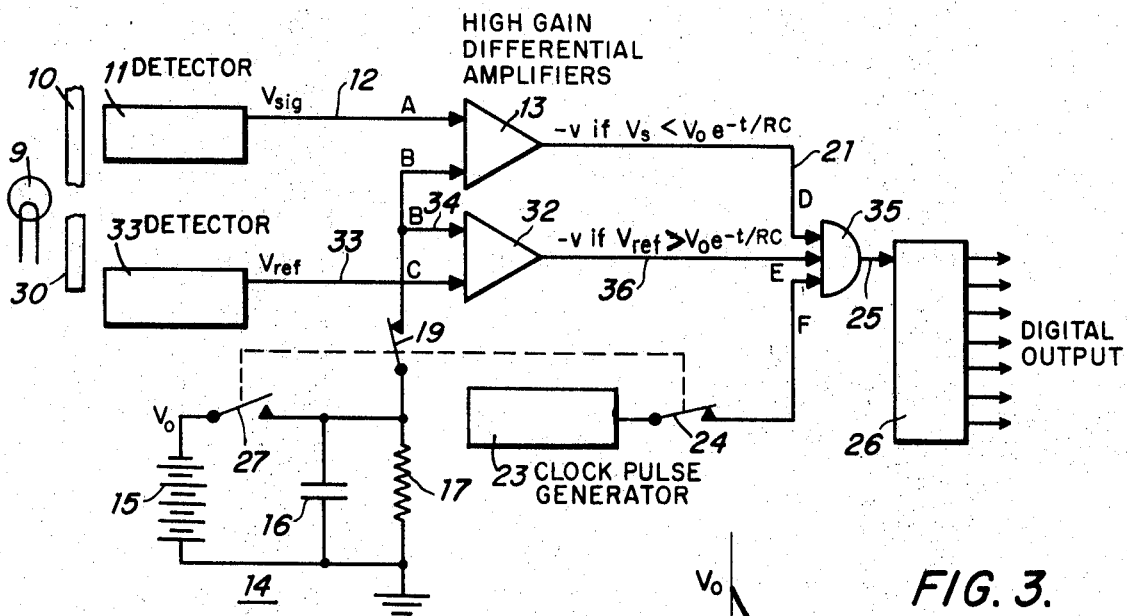
FIG. 2 illustrates a further embodiment of the invention also in block diagram form.

Turning now to FIG. 2 a block diagram of another embodiment of the invention, there is shown in addition to that of the embodiment of FIG. 1 an additional transducer 31 which is placed in proximity to a transparent photographic film or plate illuminated by the same source of radiant energy as the film or plate to be measured and which measures the incident light intensity. The output of the transducer 31 is connected to a second summation network 32 via lead 33. The capacitive discharge voltage signal is also connected to this network via lead 34. Instead of a two input AND gate such as 22, a three input AND gate 35 is connected between the clock pulse source 23 and lead 25. An additional input to the gate 35 comes from summation network 32 via lead 36.

Figure 3:
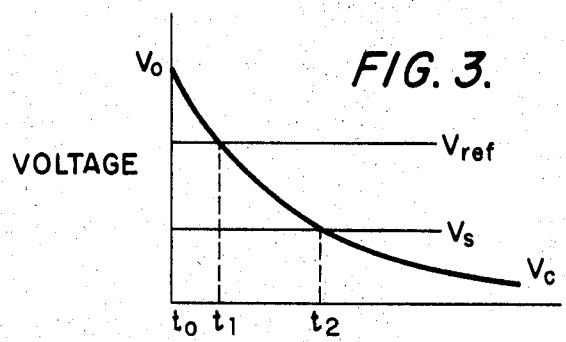
FIG. 3 is a graph of voltage versus time showing the relationships of voltages at points as marked on the embodiment of FIG. 2; and, FIG. 4 is a further graph of voltage versus time showing signals to the AND gate of the embodiment of FIG. 2.
Figure 4:
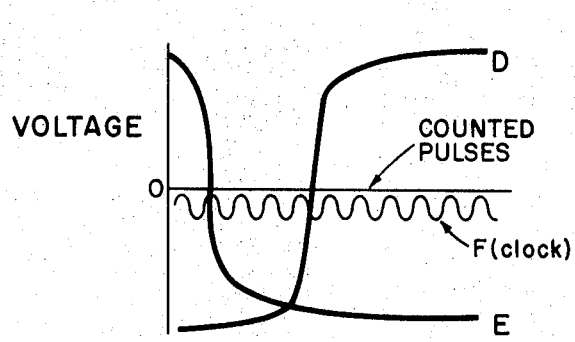

Reference is now made to FIGS. 3 and 4 in conjunction with FIG. 2 for a description of the operation of this embodiment. Due to variations of the source of illumination, changes in ambient light levels and like variations, the absolute source voltage might not accurately serve as a dynamic indication of system characteristics. The addition of the elements of this embodiment provide a more accurate and dynamic reference voltage. The reference voltage is derived from an optical-electrical transducer that produces a voltage proportional to the intensity of the light incident on the sample whose optical density is to be measured. This voltage may be obtained from the same transducer which measures the transmitted light if holding circuits, such as integrators, and mechanical light beam switches are incorporated in the input circuits and optical arrangements preceding the circuit described herein.

When the reference voltage ($V_r$) on line 33 is less than the instantaneous voltage ($V_c$), a positive output signal appears on line 36, disabling AND gate 35. This condition is depicted in the graphs of FIGS. 3 and 4 from time $t_0$ to time $t_1$. At time $t_1$ the reference voltage $V_r$ and the voltage discharge from capacitor 16 are equal, impressing a signal on line 36 which enables AND gate 35. Pulses from clock source 23 are allowed to pass through the AND gate over lead 25 to the counter 26.

As was disclosed with reference to the embodiment of FIG. 1 the clock pulses will pass to the counter until such time $t_2$ when the voltage on lead 12 is equal to or greater than the capacitive discharge voltage $V_c$. The summation network 13 will then produce a zero voltage on lead 21 disabling the AND gate. The counter 26 has now accumulated to a count, N, proportional to T, the time interval given by $t_2 - t_1$. Since $t_1$ is given by the equation $$V_r = V_c = V_0 e^{-t/RC} \quad (16)$$

and $t_2$, by $$V_1 = V_c = V_0 e^{-t/RC} \quad (17)$$

and since $$V_2 = kI_0 \quad (18)$$

and $$V_1 = kI \quad (19)$$

then $$t_1 = -RC \ln \frac{V_r}{V_0} \quad (20)$$

$$t_2 = -RC \ln \frac{V_1}{V_0} \quad (21)$$

and $$T = t_2 - t_1 \quad (22)$$

$$= -RC \ln \frac{V_1}{V_0} + RC \ln \frac{V_r}{V_0} \quad (23)$$

$$= RC \ln \frac{V_r}{V_1} \quad (24)$$

$$= RC \ln \frac{I_0}{I} \quad (25)$$

As an example of the operation of this embodiment, if the source of radiation increases in intensity for any of a number of reasons, the apparent density measurement of the object will be decreased. That is, the magnitude of the voltage $V_s$ will increase. This will cause a shift to the left (FIG. 3) of the point at which the curves $V_c$ and $V_s$ intersect, disabling the AND gate 32 at a time less than $t_2$. Hence fewer clock pulses (F) will pass through the gate and the counter accumulation will be less than it should be.

However, an increase in the radiation from the source will cause a like increase in the reference voltage $V_r$ generated by transducer 31 which effects a like shift of the time at which the curves $V_c$ and $V_r$ intersect. Hence, the number of pulses gated to the counter, or the total time that the AND gate is enabled will be the same as if the source of radiation had not varied.

Thus a direct reading digital densitometer having an output proportional to the logarithmic value indicative of has been fully and completely disclosed. The density measured is finally given by $D = N/2.303\ RC$. The calibration of the instrument is obtained by measuring R, C, and the clock frequency, and does not require the use of density standards which depend on the optical system in which they are used to realize their accuracy.

Various modifications are contemplated and may be resorted to by those skilled in the art without departing from the spirit and scope of the invention.

What is claimed and desired to be secured by Letters Patent of the United States is:

1. Apparatus for measuring the optical density of an object comprising:
 (a) electro-optical means for measuring the light-attenuating properties of the object and producing an attenuation signal indicative of said attenuation including a radiation source to irradiate the object and a radiation detector means to detect radiation from the object;

(b) reference means for producing a reference signal which varies according to variations of said attenuation signal due to parametric changes in said electro-optical means other than changes in density of the object, said reference means including a radiation detector means to detect radiation from said radiation source for producing said reference signal;

(c) function generator means for producing an electrical function signal;

(d) measuring means having an output circuit for measuring the time interval between equivalence of said function signal and said reference signal and equivalence of said function signal and said attenuation signal, said time interval being unaffected by said parametric changes, said measuring means including comparator means for detecting equivalence of said function signal and said reference signal and also for detecting equivalence of said function signal and said attenuation signal; and (e) output means coupled to said measuring means for producing a readout signal proportional to said time interval.

2. Apparatus as set forth in claim 1 wherein said output means includes a clock-pulse generator having an output circuit for producing a pulse output, together with a gate having a first input circuit coupled to the output circuit of said generator and a second input circuit coupled to the output circuit of said measuring means, for generating a number of pulses proportional to said time interval.

3. Apparatus as set forth in claim 2 wherein said function generator means includes means for producing a logarithmic function signal.

4. Apparatus as set forth in claim 1 wherein said function generator means includes means for producing a logarithmic function signal.

References Cited

UNITED STATES PATENTS

| | | | |
|---|---|---|---|
| 2,167,884 | 8/1939 | Gartland | 356—202 |
| 2,406,716 | 8/1946 | Sweet | 356—202 |
| 2,994,825 | 8/1961 | Anderson | 328—129 |
| 3,060,318 | 10/1962 | Ouvrard | 356—208 X |
| 3,076,375 | 2/1963 | Donnell | 356—204 X |
| 3,257,897 | 6/1966 | Schneider | 356—205 |
| 3,281,828 | 10/1966 | Kaneko | 340—347 |
| 3,287,723 | 11/1966 | Metcalf | 340—347 |
| 3,413,065 | 11/1968 | Funk | 356—202 |

RONALD L. WIBERT, Primary Examiner

W. A. SKLAR, Assistant Examiner

U.S. Cl. X.R.

250—214; 324—99; 340—347; 356—204, 206, 222, 223, 229